United States Patent [19]

Cuan et al.

[11] Patent Number: 4,503,515

[45] Date of Patent: Mar. 5, 1985

[54] FOOTNOTE ASSEMBLY MANAGEMENT

[75] Inventors: Victor Cuan; Rex A. McCaskill, both of Austin; James T. Repass, Round Rock; Kenneth O. Shipp, Jr., Austin, all of Tex.

[73] Assignee: International Business Machines Corporation, Armonk, N.Y.

[21] Appl. No.: 378,946

[22] Filed: May 17, 1982

[51] Int. Cl.³ .............................................. G06F 9/00

[52] U.S. Cl. ................................................. 364/900

[58] Field of Search ... 364/200 MS File, 900 MS File

[56] References Cited

PUBLICATIONS

Kilobaud-Microcomputing, Superword Processors, by Rod Hallen, pp. 214–217, ©Jun. 1980.

*Primary Examiner*—Gareth D. Shaw
*Assistant Examiner*—John G. Mills
*Attorney, Agent, or Firm*—James H. Barksdale

[57] ABSTRACT

A method of, and system for, managing assembly and formatting of footnotes and body text. Following preparation and separate storage of both body and footnote text, assembly of the footnote text with the body text can be accomplished in one pass for a review of the appearance of the document in its to-be-printed format. Two techniques are available for assembly of the document. The technique selected will be the one which will provide optimum performance and will be determined by the amount of footnote text being assembled and/or the body and footnote text edited. If any editing is performed, the new and/or edited footnote text can be re-assembled in one pass.

10 Claims, 9 Drawing Figures

FOOTNOTE ASSEMBLY MANAGEMENT

DESCRIPTION

Cross Reference to Related Applications

Commonly assigned U.S. application Ser. No. 378,944 entitled Footnote Formatting, having J. T. Repass, et al as inventors, and filed concurrently herewith.

Commonly assigned U.S. application Ser. No. 378,936 entitled Footnote Management For Display and Printing, having J. T. Repass, et al as inventors, and filed concurrently herewith.

Commonly assigned U.S. application Ser. No. 378,929 entitled Designation of Footnotes and Footnote References, having J. T. Repass, et al as inventors, and filed concurrently herewith.

Technical Field

This invention relates generally to footnoting documents, and more specifically to a method of and system for, formatting and assembling footnote text with body text for subsequent review, editing, or printing.

Background Art

Footnoting of a document such as a legal brief, book, manuscript, etc. is a well known technique of providing both uncluttered and smooth flowing information and thoughts, and background or supporting detail to a reader at different locations within the documents. The smooth flowing information is the body text of a document, and the supporting detail is made up of footnote text. In constructing such a document, efficient management has always been an elusive skill. This was so when documents where handwritten, and still presents a significant economic and throughput burden today. This is so even with the availability of flexible keyboard/display word processing systems.

During the handwritten document era, a footnote reference too low on a page often left insufficient room for an aesthetically pleasing, and well placed and proportioned, accompanying footnote or a portion thereof. The solution was to terminate the page earlier than desired, abut text against the bottom of the page and chance mismanagement of the succeeding page, write smaller, etc. Mismanagement and/or early termination remain major problems today. This is so even with the availability of modern word processing systems. The available approaches for an operator or author in preparing a footnoted document are for the most part undesirable. Excessive planning is probably the most common approach, and yet, multiple drafts are the most common result. Partially filled pages, an excessive number of footnote references and footnotes appearing on different pages, an unappealing proportion mismatch of body and footnote text, and an excessive number of pages containing only footnotes remain major problems following planning and multiple drafts.

The above mentioned problems have not gone unnoticed, however. One system on the market today provides for footnote management upon printout. With this system, an operator can prepare a footnoted document in one pass, but particular operator attention is required. During preparation, body text is keyed to a body text frame up to a reference point, a footnote reference number is keyed, a footnote frame is called, a corresponding footnote number is keyed, text for the footnote is keyed, and then the body text frame is recalled. Body and footnote text are stored separately. The footnote text is stored in a footnote library for later recall. Following document preparation, there is an opportunity to separately review and edit the body and footnote text, but there is no opportunity to display review and edit an assembled document prior to printing. That is, the first opportunity an operator has to view an assembled document is following printing. During printout, the system merges the body and footnote text. On the whole though, planning and multiple drafts are reduced, and preparation is in a logical manner. However, resulting aesthetics on occasion are less than desired. This is due in part to imposed system restraints such as a requirement that there be at least one line of body text on each page. In this case, large unprinted areas on numerous pages can occur. As such, management of body and footnote text is less efficient and flexible than desired.

The above described capabilities of penmanship and word processing systems are prior art to the extent that a semblance of a desired end result is achievable. What has not been achievable though, is the flexibility of efficiently meeting operator desires and managing document assembly tasks for output. It is these deficiencies which cause the prior art to fall short of either anticipating or rendering the instant invention obvious. More specifically, the instant invention presents an advance over prior art systems and techniques in that pagination, widow line decisions, hyphenation, printing, and automatic system reference/footnote numbering and updating are provided in a single pass through the document. Further, the instant invention presents an advance over the prior art in that the assembled document in its to-be-printed form can be displayed for review and editing prior to printing.

DISCLOSURE OF THE INVENTION

A unique method of, and system for, managing the assembly of body and footnote text is provided in order that an operator may format and assemble footnote text in a document. Format and assembly of the footnote text can be either at the bottom of pages of the document or at the end of the document. In addition, according to the method and system of this invention, the operator can hyphenate the document, adjust line endings, cause page ending decisions and associated widow/orphan line decisions to be made, and cause printing of the document in a single pass operation. Following input keying of the body and footnote text, operator procedure calls for causing the system to assemble the body and footnote text. The assembly operation involves combined merge and pagination operations to which either one of two separate algorithms are acceptable. A fast algorithm or the "limited footnote algorithm" is used when processing footnotes of limited size. A slower algorithm or the "indefinite footnote algorithm" is used when processing lengthy footnotes. The system automatically determines which algorithm is to be in effect. This determination is on a per page basis. Whenever possible, the "limited footnote algorithm" will be the algorithm in effect. Following assembly, the document can be display recalled on a page basis for review and editing. Thereafter, the document is ready to be printed.

BEST MODE FOR CARRYING OUT THE INVENTION

General Description

Figure 1:
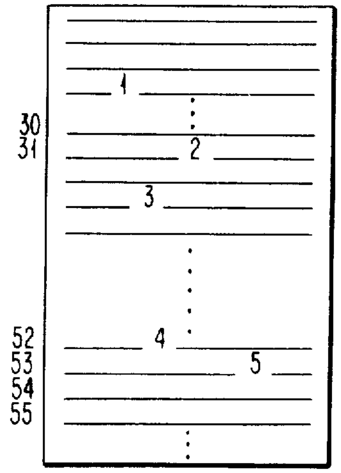
FIG. 1 is a pictorial representation of an unpaginated page of a footnoted document.

For a more detailed understanding of the invention, reference is first directed to FIG. 1. In this figure there is illustrated body text of a document being created. It is to be assumed that an operator is keying to a keyboard-/display word processing system. Prior to input of the document, menus were presented to the operator for selecting and defining formats for the document. Thereafter, the illustrated body text was keyed. Keying of this body text involved keying up to a footnote reference point. During this body text keying, the text is displayed and editing is permitted. At the footnote reference point, a menu is called from which a footnote task is selected. This causes a display frame to be presented for keying the footnote. Editing of the footnote is also permitted. Following input of the footnote, the operator recalls the body text display frame for continued keying, and the footnote is stored away in a footnote library. Upon recall of the body text display frame, the system applies an appropriate footnote reference designation to the body text at the footnote reference point, and logs the location in the footnote library of the corresponding footnote. Following input keying of the body and footnote text, operator procedure calls for causing the system to assemble the body and footnote text. The assembly operation involves combined merge and pagination operations. Following assembly, the document can be display recalled on a page basis for review and editing. Thereafter, the document is ready to be printed.

The illustrated body text in FIG. 1 has not yet been divided into even page segments and the footnote text has not yet been assembled and formatted with the body text.

For purposes of the following explanation, it is to be assumed that each printed page will contain 40 lines with the bottom 9 lines being dedicated to footnote text. Included within the 9 lines will be 3 lines for an associated separator line and a blank line above and below the separator line. Line numbers have been provided adjacent the left edge of each of the figures for reference purposes. It is also to be assumed that Arabic numerals have been chosen for designating footnote references and footnotes. In addition, it is to be assumed that the interfootnote spacing is zero.

Figure 2:
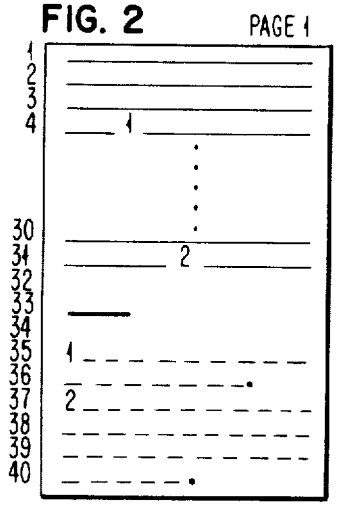
FIG. 2 is a pictorial representation of the first page of the footnoted document of FIG. 1 following an assembly operation.
Figure 3:
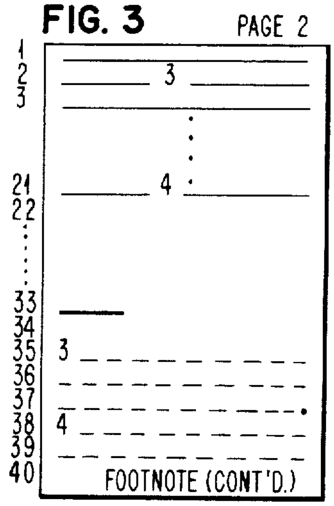
FIG. 3 is a pictorial representation of the second page of the footnoted document of FIG. 1 following the assembly operation.
Figure 4:
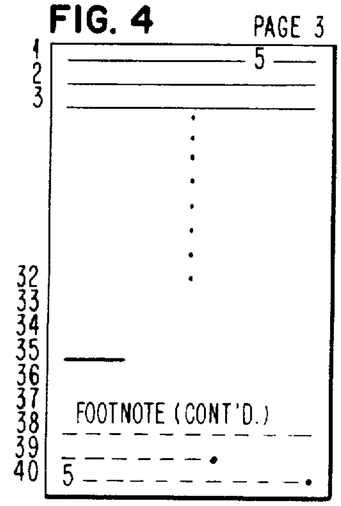
FIG. 4 is a pictorial representation of the third page of the footnoted document of FIG. 1 following the assembly operation.
Figure 5:
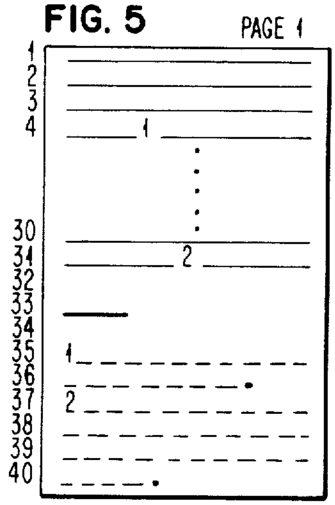
FIG. 5 is a pictorial representation of the first page of the footnoted document of FIG. 1 reassembled with additional lines available for footnotes.
Figure 6:
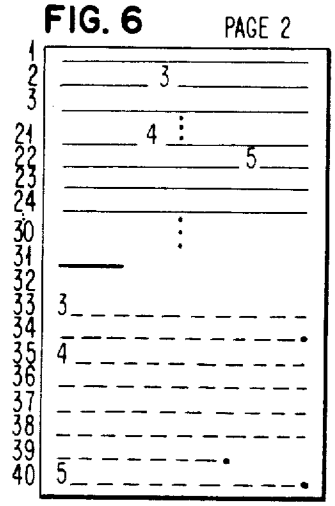
FIG. 6 is a pictorial representation of the second page of the footnoted document of FIG. 1 reassembled with additional lines available for footnotes.
Figure 7:
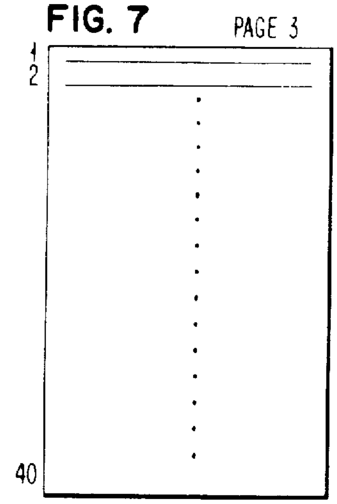
FIG. 7 is a pictorial representation of the third page of the footnoted document of FIG. 1 reassembled with additional lines available for footnotes.

After creating the body text as shown in FIG. 1, in order to obtain the resulting 3 pages shown in FIGS. 2–4, an assembly operation is required for merging the separately stored footnote and body text and for paginating the assembled document for display and/or ultimate printing. For the 3 pages as shown in FIGS. 5–7, the footnote format was changed such that the bottom 13 lines of each page are dedicated to footnote text. This contrasts with the 9 lines dedicated to footnote text in FIGS. 2–4. In both instances, when the number of footnote lines is specified, a maximum number of lines is established for footnotes. Lines not needed for footnotes can be filled by the system with body text lines as will be brought out more clearly later in the specification. An assembly operation is also required to obtain the pages of FIGS. 5–7.

A normal merge operation involves combining a portion of one document with another. A normal pagination operation is for dividing a document into page size segments capable of being printed on the paper being used. Such an operation generally involves inserting and deleting page end codes. The assembly operation contemplated herein for formatting a footnoted document requires more than just separate merge and pagination operations. These operations must be performed in conjunction with one another in order to attain the desired results. There must be a balancing of the text and footnotes within a page.

First, a text storage buffer (TSB) is loaded with text until full. The system begins adjusting lines between the operator specified margins and scans each line for footnote references and any formatted footnote text. Formatted footnote text can occur with body text due to the document having been once assembled. If formatted footnote text is detected the system will delete it. This is necessary since the document must be reassembled. During reassembly the system will re-format footnote text for every footnote reference in the document.

For every footnote reference on a line following a line adjust operation, a pointer is stored in a reference buffer to the corresponding footnote text. This pointer will remain in the reference buffer until the corresponding footnote text has been formatted and assembled at the bottom of a page or the end of the document.

For the first footnote of a page, the system assumes that the limited footnote algorithm is to be used. Based on this assumption, the footnote text for every reference detected on a line is copied into a formatted footnote buffer where it is assembled and formatted. If, due to the size of the formatted footnote buffer, not all of the footnote text can be loaded at one time, the indefinite footnote algorithm, which will be described later, is called.

This process is repeated for each line in the text storage buffer until the maximum number of body text lines per page and/or the maximum number of footnote text lines per page is reached, or until there are no more lines in the document. When either condition occurs and the limited footnote algorithm is being used, then all of the formatted footnote text is in the formatted footnote buffer and is simply copied to the bottom of the page between special formatted text controls.

If a page contains large footnotes and the system determines that the indefinite footnote algorithm must be used to place footnotes at the bottom of a page, corresponding footnote text separately stored on a diskette is read into the text storage buffer for every footnote reference having a pointer in the reference buffer. The footnote text is then formatted properly, and stored back onto the diskette. Thereafter, when the maximum number of body text lines per page and/or the maximum number of footnote text lines per page is reached, or when there are no more lines in the document, the indefinite algorithm will copy each formatted footnote individually from the diskette to the bottom of the page between special formatted text controls until the proper number of footnote text lines have been copied.

As pointed out earlier, when a number of footnote lines is specified, this number establishes the maximum number of lines on the bottom of a page which can be used for footnotes. As a result, the number of lines initially available for body text is established.

Even if the indefinite footnote algorithm is used for one page, the limited footnote algorithm will be used again on the following page, if possible.

DETAILED DESCRIPTION

Figure 8:
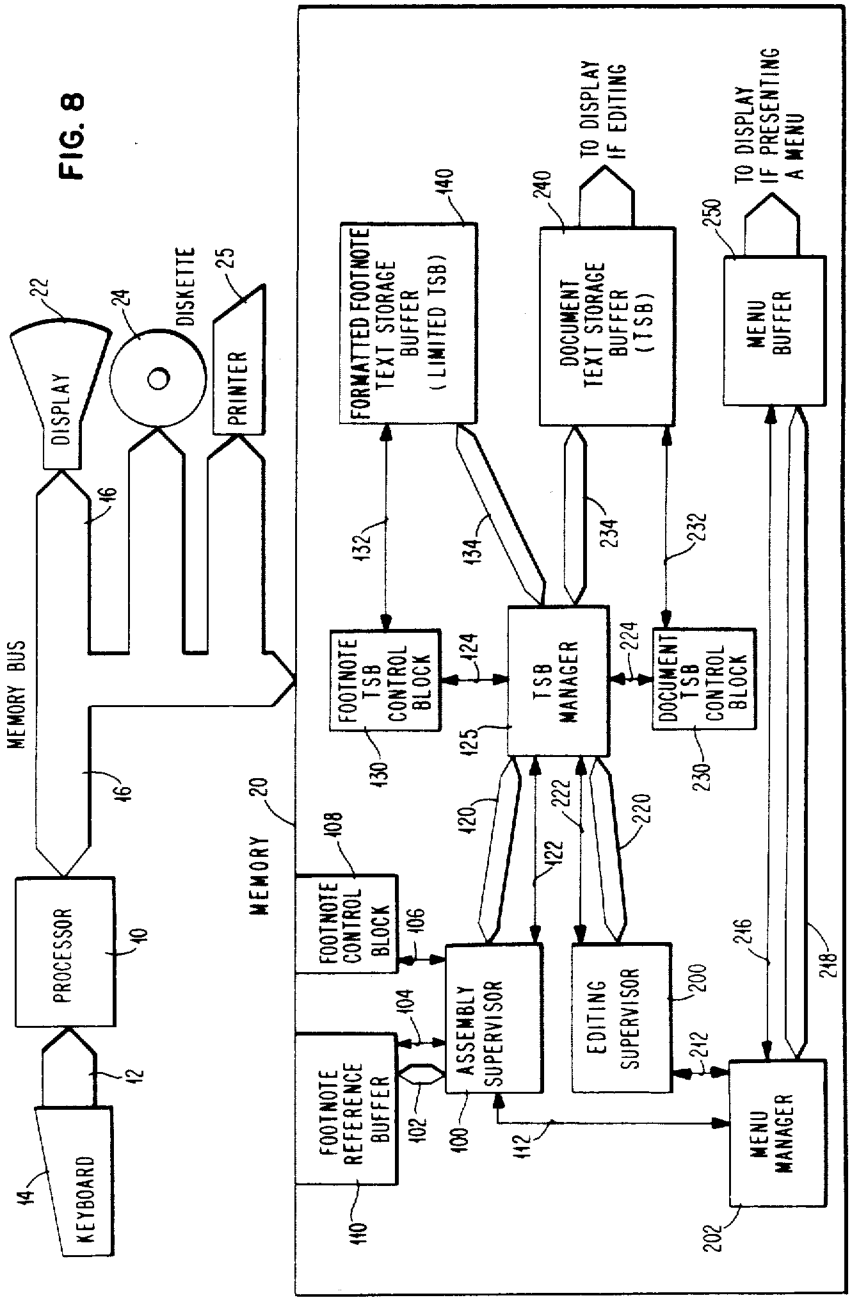
FIG. 8 is a block diagram showing a word processing system used for performing the invention of this application.

Refer next to FIG. 8. In this figure is shown a portion of a text processing system, including a processor 10 to which is connected a bus 12 leading from a keyboard 14. Character data generated by manual actuation of keys on keyboard 14 causes character related signals to be applied to processor 10. Processor 10 provides on an output memory bus 16 a data stream in which the characters selected by actuation of keyboard 14 appear suitably encoded.

Keyboard 14 is made up of a standard set of alpha/numeric graphic keys for keying characters, numbers, punctuation marks, and symbols, and also includes function and format control keys for causing and controlling a carriage return, indent tab, etc. In addition, the keyboard includes a second set of control keys for issuing special control commands to the system. These control keys are for controlling cursor movement, for setting the keyboard into a number of different modes, for use in conjunction with other keys for defining and controlling operations and other functions, etc.

Memory bus 16 extends to a memory unit 20 which is preferably a random access memory, to a display unit 22, to a diskette unit 24, and to a printer 25.

Included within memory unit 20 are two text storage buffers. One is a formatted footnote text storage buffer (TSB) 140 and the other a document TSB 240. The formatted footnote TSB 140 is used only by an assembly supervisor 100 when a limited footnote resolution algorithm is used to resolve and format footnotes at the bottom of a page. The document TSB 240 is used as a window into indefinite length text pages stored on a diskette readable by unit 24. Both assembly supervisor 100 and an editing supervisor 200 use the document TSB 240.

A footnote TSB control block 130 is linked to formatted footnote TSB 140 via a channel 132. A document TSB control block 230 is linked to document TSB 240 via a channel 232.

TSB manager 125 is linked by channels 124 and 224 to footnote TSB control block 130 and document TSB control block 230, respectively.

TSB manager 125 is linked by channels 134 and 234 to formatted footnote TSB 140 and document TSB 240, respectively. Editing supervisor 200 is linked via channels 220 and 222 to TSB manager 125. Editing supervisor 200 contains keystroke processing routines which are invoked based on the key pressed on keyboard 14.

In operation of the system of FIG. 8, a body text encoded data stream applied along memory bus 16 is stored in document TSB 240. In a process of correction and editing the contents of the body text in document TSB 240, selected portions or lines of a page are presented to the operator on display unit 22.

In addition to editing the contents of the body text, editing supervisor 200 may also create and revise footnotes within document TSB 240 in order that footnotes of indefinite length can be supported.

A menu manager 202 is linked via channels 112 and 212 to assembly supervisor 100 and editing supervisor 200, respectively, and is used when a menu is to be displayed. Menu manager 202 is linked via channels 216 and 218 to a menu buffer 250.

Assembly supervisor 100 is linked to TSB manager 125 via channels 120 and 122. Assembly supervisor 100 provides control routines necessary to execute an assembly operation for paginating and merging body text stored in document TSB 240 with formatted footnote text stored either in formatted footnote TSB 140 (if all of the formatted footnote text for the body text page will fit) or on a diskette.

Assembly supervisor 100 is linked to a footnote control block 108 via channel 106. Footnote control block 108 is used to store status information during the assembly operation for resolving and formatting footnotes.

Assembly supervisor 100 is linked to a footnote reference buffer 110 via channels 102 and 104. Footnote reference buffer 110 contains pointers to diskette stored footnote text which has not yet been placed at the bottom of a page or at the end of the document during the assembly operation.

Figure 9:
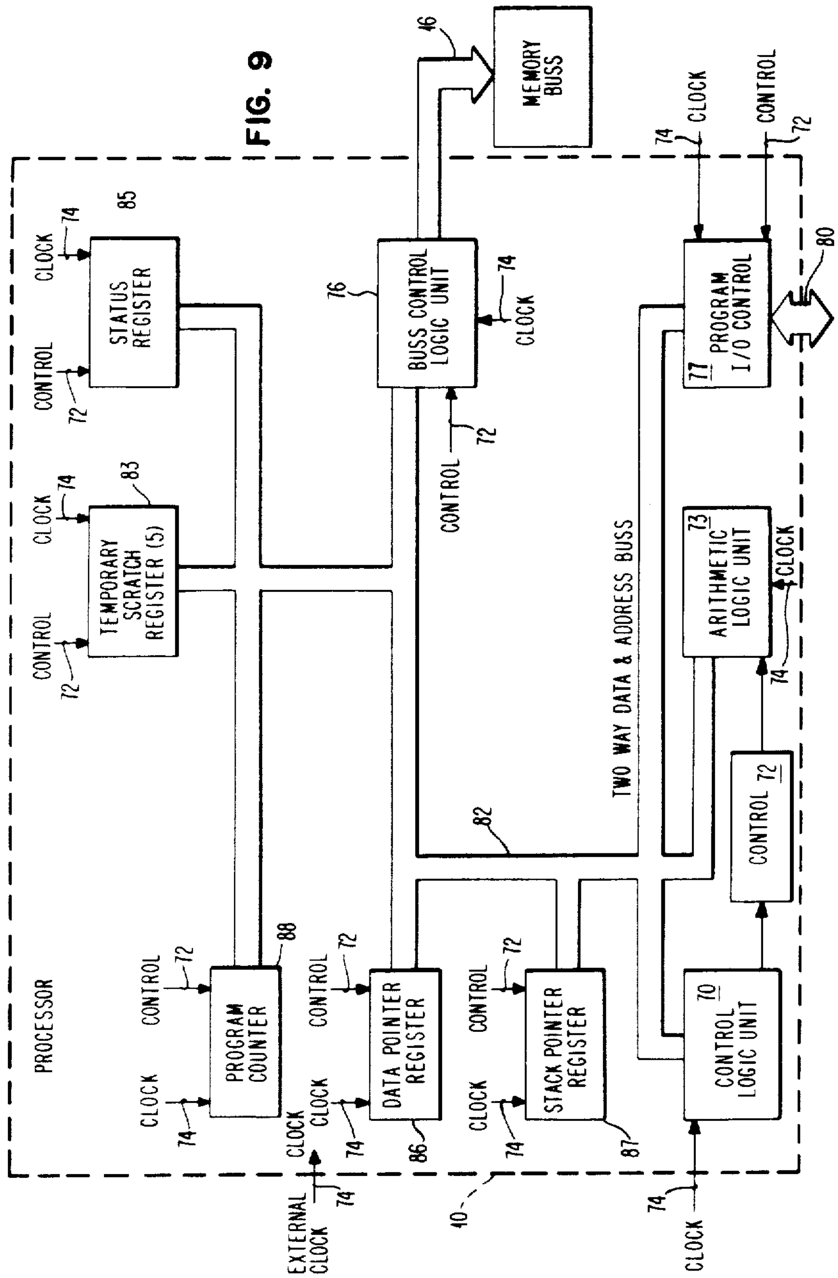
FIG. 9 is a block diagram illustrating the makeup of the processor shown in FIG. 8.

Refer next to FIG. 9. In this figure are shown the details of processor 10 which is capable of performing the operations of this invention under program control. In practice, processor 10 includes an INTEL®8086 Microcomputer chip. Typical logic hardware elements forming processor 10 include a control logic unit 70 which responds to instructions from memory 20 on bus 16. The control logic unit 70 is also in the data stream identified by the data and address bus 82 interconnected to various other logic units of processor 10.

In response to instructions from random access memory 20, control logic unit 70 generates control signals to other logic elements of processor 10. These control signals are interconnected to the various elements by means of a control line 72 which is illustrated directly connected to an arithmetic logic unit 73 and identified as a "control" line 72 to other elements of processor 10. Synchronous operation of the control unit 70 with other logic elements of processor 10 is achieved by means of clock pulses input to processor 10 from an external clock source on bus 74. This bus is also shown interconnected to various other logic elements of processor 10.

Data to be processed in processor 10 is input either through a bus control logic unit 76 or a program input/output control logic unit 77. The bus control logic 76 connects to random access memory 20 and receives instructions for processing data input to input/output control 77. Thus, input/output control 77 receives data from keyboard 14 while bus control logic 76 receives instructions from memory 20. Note that different storage sections of memory 20 are identifiable for instruction storage and data storage. Device controls from processor 10 are output through program input/output controller 77 over a data bus 80.

Input data on the data bus 16 is passed internally through processor 10 on the bus 82 to control unit 70. Arithmetic logic unit 73, in response to a control signal on line 72 and in accordance with instructions received on memory bus 16, performs arithmetic computations which may be stored in temporary scratch registers 83. Various other transfers of data between the arithmetic logic unit 73 and other logic elements of processor 10 are of course possible. Such additional transfers may be to a status register 85, data pointer register 86 or a stack pointer register 87. Also in the data stream for these various logic elements by means of the bus 82 is a program counter 88.

A particular operating sequence for processor 10 is determined by instructions on bus 16 and input data on the bus 16 or on bus 80 from keyboard 14. As an example, in response to received instructions, processor 10 transfers data stored in scratch registers 83 to one of registers 86, 87, or 85. Such operations of processors as detailed in FIG. 9 are considered to be well known and understood by one of ordinary skill in the data processing field. A detailed description of each of the operations of the processor of FIG. 9 for the described invention would be counterproductive to an understanding of the invention as claimed.

Table 1 illustrates a routine used by processor 10 for soliciting operator input of footnote formatting information.

TABLE 1

FOOTNOTE FORMAT ROUTINE

```
BEGIN (FN FMT)
INITIALIZE WORK SPACE AND CONTROL BLOCKS
COPY CURRENT VALUE OF ALL MENU OPTIONS
INITIALIZE DFD (DYNAMIC FRAME DESCRIPTOR)
WITH MENU OPTION VALUES
UNTIL MENU IS SUCCESSFULLY EXITED OR
CANCELLED DO DISPLAY FOOTNOTE FORMAT MENU
UNTIL MENU MANAGER RETURNS
VALIDATE/COMPARE VALUES
IF THE "CHANGE FOOTNOTE TYPING OPTIONS"
DIRECTIVE OPTION WAS SELECTED THEN
DISPLAY FOOTNOTE TYPING OPTIONS MENU AND
SAVE OPERATOR INPUT FOR LEADING/TRAILING
CHARACTERS AND "FOOTNOTE CONTINUED" TEXT
ELSE
IF A PARAMETER CONFLICT EXISTS THEN
POST OPERATOR MESSAGE
ELSE
INDICATE FOOTNOTE FORMAT MENU HAS
SUCCESSFULLY EXITED
ENDIF
ENDIF
ENDDO
FREE WORK SPACE
RETURN
END TABLE 1 (FN FMT)
```

FOOTNOTE FORMAT

If a "Change Footnote Format" option is selected in a Format Selection menu presented to the operator for any number of tasks, then the system displays a Footnote Format menu as shown in MENU 1 below.

The Footnote Format is a part of both the Document and Alternate Document Format of the document. The Document and Alternate Document Format are two independent sets of formats which the operator may begin using at the top of any page in the document. Unless specified otherwise, the system defaults to the Document Format.

MENU 1

Chg Document Fmt    Brief  Ins
DSK001    Kyb 1    Pitch 12

FOOTNOTE FORMAT

| ID | ITEM | YOUR CHOICE | POSSIBLE CHOICES |
|---|---|---|---|
| a | Typestyle Number | | 1-31 (10 Pitch)<br>80-111 (12 Pitch)<br>154-175 (Proportional)<br>215-230 (15 Pitch) |
| b | Separator Character | — | Any available character |
| c | Number of Separator Characters | 20 | 1-450 |
| d | Maximum Number of Footnote Text Lines Per Page | 48 | 1-999 |
| e | Number of Lines Between Footnotes | 0 | 0-999 |
| f | Footnote Numbering | 1 | 1 = Document<br>2 = Page |
| g | Footnote Numbering Graphic | | Any available character, or none |
| h | Footnote Placement | 2 | 1 = Document<br>2 = Page |
| i | Change Footnote Typing Options | | |

When Finished with this menu, press ENTER.
Type ID letter to choose ITEM; press ENTER:

Each ITEM in MENU 1 is briefly described below.

Typestyle Number: A plurality of choices of fonts including a variety of typestyles and pitches are available from MENU 1. Both typestyle and pitch are determined by a Font ID selected by the operator from POSSIBLE CHOICES. If no ID is specified, the system will use a Line Format typestyle default value.

Separator Character: Any graphic character available on a selected font can be specified or selected by the operator to form a separator line separating body and footnote text.

Number of Separator Characters: The operator can specify the number of characters to be used in making up the separator line. The number will only be measure limited. It is to be noted that a blank line will always precede and follow the separator line.

Maximum Number of Footnote Text Lines per Page: The number specified by the operator will be the maximum number of lines available at the bottom of the page for footnote text. Included with this number will be a specified number of lines between footnotes. Not included in the specified number are the blank lines before and following the separator line, the separator line, and a dedicated line at the bottom of the page. Although not included in the maximum number of footnote text lines, these lines are included in the total page line count.

Number of Lines Between Footnotes: The operator can specify the interfootnote line spacing for formatting purposes to improve aesthetics. Footnote text will always be single spaced.

Footnote Numbering: An operator can specify whether or not footnote numbering is to be reset at page boundaries.

Footnote Numbering Graphic: If footnote numbering is to be reset at page boundaries and a non-numeric graphic character such as an asterisk is specified, the first footnote will be numbered "*", the second will be numbered "**", etc.

Footnote Placement: The operator can specify whether or not footnotes are formatted and placed at the bottom of each page or the end of the document. Range: 1=Yes 2=No Following selections from MENU 1 and depression of the ENTER key, a Footnote Typing Options Format menu will be presented to the operator. This is illustrated below as MENU 2 wherein choices are available for the fixed portion of both footnote and footnote reference designations. The type of the variable portions of the footnote and footnote reference designations is selected from MENU 1.

MENU 2

Chg Document Fmt Brief Ins
DSK001 Kyb 1 Pitch 12

FOOTNOTE TYPING OPTIONS

| ID | ITEM | YOUR CHOICE | POSSIBLE CHOICES |
|---|---|---|---|
| For Body Text: | | | |
| a | Leading Characters | "½ INX UP" | Up to 8 characters, or none |
| b | Trailing Characters | "½ INX DOWN" | Up to 8 characters, or none |
| For Footnote Text: | | | |
| c | Leading Characters | "½ INX UP" | Up to 8 characters, or none |
| d | Trailing Characters | "½ INX DOWN" | Up to 8 characters, or none |
| e | 'Continued Footnote' Message Characters | (Footnote Continued) | |

When finished with this menu, press ENTER.
Type ID letter to choose ITEM; press ENTER:

An explanation of each ITEM listed in MENU 2 is set out below.

Leading Characters: These characters include both controls and graphics to be generated by the system immediately before the variable portion of the footnote and footnote reference designation both in body and footnote text.

Trailing Characters: These characters include both controls and graphics to be generated by the system immediately after the variable portion of the footnote and footnote reference designation both in body and footnote text.

'Continued Footnote' Message Characters: Any character, tab, indent tab, space, required space, required backspace, or word underscore can be selected for system placement (1) following the last footnote line on a page, and (2) before the first footnote line on the next page when a footnote "spills over" from one page to the next.

When the operator completes entry of all desired choices and depresses the Enter key against a prompt to type the ID to choose an item displayed on the Prompt Line, the system will update the Document or Alternate Format of the document with the values selected by the operator and re-display the Format Selection menu.

Following the above set up routine, the operator is now ready to begin preparing a footnoted document. Footnotes are created during the normal Create/ Revise Document task via a Footnote instruction. When the operator selects "Footnote" from an Instruction Menu and depresses the Enter key, a Footnote Menu illustrated below as MENU 3 will be presented.

MENU 3

Create Document Brief Ins
DISK01 Pg. 1 Ln. 13 Kyb 1

FOOTNOTE

| ID | ITEM | YOUR CHOICE | POSSIBLE CHOICES |
|---|---|---|---|
| a | Create/Revise Footnote Text | 1 | 1 = Yes 2 = No |
| b | Reset Footnote Number or Character | | |
| c | Document Name | | |
| d | Diskette Name | | |
| e | System Page Number | | |

When finished with this menu, press ENTER.
Type ID letter to choose ITEM; press ENTER:

The ITEMS against which the operator makes choices are described below.

Create or Revise Footnote Text: Operator selection here is for calling a blank Footnote Typing Frame illustrated as FRAME 1 later herein if typing a new footnote is in order, or a Footnote Typing Frame with an existing footnote as illustrated in FRAME 2 later herein in order for the operator to make revisions.

Reset Footnote Number or Character: This option is selected whenever the operator desires to override the automatic system-generated sequence of footnote numbering or designations (i.e., 1, 2, 3, . . .) by specifying a specific number or other graphic character or characters.

If a number is entered, then footnote numbering by the system will be reset to that value. If a graphic is entered, when the automatic sequencing of numeric values will be suspended until the next "null" or numeric value is encountered.

The following two items should only be selected if footnotes are to be stored in a document other than the editing document.

Document Name: Selection here is to (1) store footnote text to be created, (2) locate footnote text to be revised, or (3) locate existing footnote text to be included in the document.

Diskette Name: The name of the diskette on which the above document resides is entered by the operator.

System Page Number: An entry here is for calling a page which contains the footnote text. If both the Document Name and Diskette Name are blank, then the system will assume that footnote text is to be stored with the document being created or edited. The system will store the footnote text on the next available page on or above 9000 (i.e., 9000, 9000.0.1, 9000.0.2, . . . ) and after existing footnote pages.

If the operator specifies another Document Name/-Diskette Name, then any page number of that document may be used to store the footnote text. If no page number is specified, then the first available page will be used. The operator may also specify that a particular existing page number be used by selecting this ITEM and entering the page number.

The Footnote Instruction thus created in memory will have the following makeup:

(1) Footnote Reference Control (FTR) followed by the following controls:
(2) Begin Formatted Text Control (BFT)
(3) Leading characters (4) Footnote number
(5) Trailing characters
(6) End Formatted Text Control (EFT)

The BFT/EFT control pair is used by the system to identify data that was generated by the system and may be later updated or modified by the system.

The value of the footnote number itself may be:

(1) Sequentially assigned by the system when the footnote instruction is created (and prior to assembly for merging and paginating the footnote and body text).
(2) Explicitly assigned by the operator when the footnote instruction is created.
(3) Determined by the system during the assembly operation.

As a result, a footnote number (together with any leading and/or trailing characters) will always appear in the body text after a footnote instruction is created.

Upon revising a footnote instruction, the Footnote Instruction can be altered by placing the cursor on the Footnote Instruction and pressing the Enter key. The Footnote Menu (MENU 3) will be recalled.

During creation or revision of footnote text, if "Create or Revise Footnote Text" is set to "Yes" in the Footnote Menu (MENU 3), a Footnote Typing Frame (Frames 1 and 2) will be displayed when the ENTER key is depressed.

FRAME 1
(Footnote Typing Frame - Create)

| | | | | | |
|---|---|---|---|---|---|
| Create Footnote | Brief | | Ins | | |
| DISK01 | | Pg. 1 | Ln. 13 | Kyb 1 | Pitch 12 |

When finished, press ENTER.

FRAME 2
(Footnote Typing Frame - Revise)

Revise Footnote
DISK01

J. J. Vreeland, What to Look for When You Review Programming Documents for Product Usability, Technical Report TR03.124 (December, 1980); may be obtained from the IBM Corporation, Santa Teresa Laboratory, 555 Bailey Avenue, P.O. Box 50020, San Jose, CA 95150
When finished, press ENTER.

The format of the footnote text and the page presentation characteristics for footnotes are determined by the Document or Alternate Format and the Footnote Format. After the footnote and body text have been assembled, the footnote text will always be single spaced regardless of the line spacing of the body text. The Context Field on the First Status Line of the Footnote Typing Frames will display either "Create Footnote" or "Revise Footnote", as appropriate.

In order to create a reference to an already existing footnote, operator procedure is to specify the diskette name, document name, and page number for the footnote and set "Create or Revise Footnote Text" to "No" in the Footnote Menu (MENU 3). After the operator has specified the document name and diskette name the first time a footnote was included, the default will be the previous document and diskette name used.

During document assembly, body text and footnote text was resolved. Resolution requires combined pagination and merge operations if both body and footnote text are to appear on the same page.

Footnote text is formatted for output to a display for review or to a printer by either a Paginate Document task, a Merge task, or a Paginate/Hyphenate option of a Check Document task. The Paginate Document task will assemble the document to permit the operator to view the pages of the document made up of body and footnote text exactly as it will be printed.

The makeup of the footnote text at the bottom of the page will be:

Begin Formatted Text Control (BFT)
Line Format Change (to set footnote format)
Begin Keep Control
Required Carrier Return (for blank line above separator line)
Separator line, Required Carrier Return
Required Carrier Return (for blank line below separator line)
Footnote Text
Line Format Change (to return to format prior to footnote)
"n" number of indent tabs (where "n" is determined from the indent level at the Begin Formatted Text control).
End Keep Control
End Formatted Text Control (EFT)

The footnote reference number or other designation in the body text will be used to determine the footnote number or other designation to be printed and displayed. The system will automatically insert footnote designations together with any leading and trailing characters at the beginning of the footnotes automatically during assembly only.

Ordinarily, the system will assign footnote numbers in sequential order. However, if the operator has specified that a particular number be used, the system will assign that number to the footnote, and subsequent system assigned numbers will be determined using that number as a base.

Automatic sequencing may be interrupted by the presence of non-numeric footnote reference designations. The next numeric footnote reference will resume the automatic sequencing by the system.

If footnotes are inserted, moved, or deleted from the assembled document, then the document must be reassembled to renumber the footnotes.

Table 2 describes the routine performed by the assembly supervisor 100. This is the main routine that controls the pagination and merge operations.

This main routine (DOCPA) invokes other routines to adjust lines, make page ending decisions, and process, format, and renumber footnotes.

TABLE 2

```
BEGIN (DOCPA)
OBTAIN FORMATTING INFORMATION FOR
DOCUMENT
INITIALIZE CONTROL BLOCKS AND WORK AREAS
GO TO STARTING PAGE
IF PRESERVE PAGE ENDINGS IS NOT INDICATED
THEN UNTIL END OF DOCUMENT OR CANCEL
PRESSED DO
IF READJUSTING LINE AND A FOOTNOTE WAS
ENCOUNTERED ON THAT LINE THEN
INVOKE (FNNUM) - UPDATE/INSERT FOOTNOTE
NUMBER IN BODY TEXT
ENDIF
IF SPELL-ASSISTED HYPHENATION IS ON THEN
PERFORM SPELLING-ASSISTED HYPHENATION WITH
LINE ADJUST
ELSE
PERFORM LINE ADJUST
```

TABLE 2-continued

```
ENDIF
IF THE LINE IS NOT TO BE READJUSTED THEN
CALL (LINEPOS) TO DETERMINE IF LINE POSITION
CAUSES A PAGE END DECISION
IF PAGE END DECISION THEN
DETERMINE LOCATION OF PAGE END
ELSE
IF LINE END CODE IS A PE OR RPE THEN
INDICATE PAGE END DECISION
ENDIF
ENDIF
IF PAGE END DECISION THEN
CALL (PAGEEND) TO INSERT A PAGE END AND
INCREMENT THE POINT OF OPERATION TO NEXT
PAGE
ELSE
INCREMENT PAST LINE END CODE
ENDIF
ENDIF
ENDDO
INVOKE (EDOC) - FOOTNOTE END OF DOCUMENT
PROCESSOR
ENDIF
CLEANUP AFTER TERMINATING PAGINATE
CLEANUP FOOTNOTE PROCESSING
FREE WORK AREAS
END TABLE 2 (DOCPA) RETURN TO CALLER
```

Table 3 describes a subroutine (LINEPOS) of the routine DOCPA. This subroutine calculates the positional change caused by line ending codes. The paginator (DOCPA) uses this information in determining where to make page ending decisions. The subroutine (LINEPOS) also invokes a routine (RSOLVE) to fetch and resolve footnote text.

TABLE 3

```
BGNPROC (LINEPOS)
DETERMINE LINE POSITION CHANGE
IF THE LINE END CAUSES THE LINE POSITION TO
CHANGE THEN UPDATE THE LINE POSITION CHANGE
BY THE LINE SPACING
SAVE LINE SPACING
ENDIF
OBTAIN THE LINE DENSITY FOR 1 LINE
SAVE THE LINE DENSITY FOR THE LINE SPACING
CALCULATE AND SAVE THE LINE POSITION CHANGE
AT THE END OF THE LINE
IF A FOOTNOTE REFERENCE WAS ENCOUNTERED
ON THE LINE THEN
INVOKE (RSOLVE) - RESOLVE FOOTNOTE INTO THE
FOOTNOTE BUFFER
ENDIF
IF FOOTNOTE ROUTINE WANTS PAGE END DECISION
THEN SET PAGE END DECISION
ENDIF
ADD LINE POSITION ESCAPEMENTS TO PENDING
FOOTNOTE ESCAPEMENTS
DETERMINE NUMBER OF LINES FROM BOTTOM
OF PAGE
DETERMINE NEW LINE POSITION
ENDPROC TABLE 3 LINEPOS
```

Table 4 describes a subroutine (PAGEEND) of the routine DOCPA that makes page ending decisions by inserting a page end code into the document TSB 240. Prior to inserting the page end code, the subroutine (PAGEEND) invokes a routine (EPAG) to process and insert all footnote text accumulated in the formatted footnote TSB 140 or stored on diskette unit 24 into document TSB 240.

TABLE 4

```
BGNPROC PAGEEND
IF THERE IS PENDING FOOTNOTE TEXT THEN
INVOKE (EPAG) - FOOTNOTE END OF PAGE
```

TABLE 4-continued

```
PROCESSOR
ENDIF
IF NOT A PAGE END CODE THEN
INSERT THE PAGE END CODE
ELSE
MOVE ACROSS PAGE END
EXIT IF END OF TEXT PAGES
MOVE TO START OF TEXT ON NEXT PAGE
ENDIF
IF PRINT INDICATED THEN
PRINT PAGE
ENDIF
ENDPROC TABLE 4 PAGEEND
```

Table 5 describes the routine (FNNUM) which determines the type of footnote numbering or designations to be used and when to reset and/or increment the numbering or designations.

TABLE 5

```
BEGIN (FNNUM)
IF FOOTNOTE REFERENCE RESETS THE FOOTNOTE
NUMBERING THEN
RESET THE FOOTNOTE COUNTER TO THE SPECIFIED
VALUE
INSERT THE COUNTER INTO THE BODY TEXT
ELSE
IF THIS IS THE FIRST FOOTNOTE OF THE DOCUMENT
AND NUMBERING IS NOT BEING DONE ON A PER
PAGE BASIS
THEN
SET THE FOOTNOTE COUNTER TO 1
INSERT THE COUNTER INTO THE BODY TEXT
ELSE
INCREMENT THE FOOTNOTE COUNTER
IF THIS IS THE FIRST FOOTNOTE OF A PAGE AND
NUMBERING IS BEING DONE ON A PER PAGE BASIS
THEN SET THE FOOTNOTE COUNTER TO 1
ENDIF
IF FOOTNOTE GRAPHIC NUMBER IS NOT SPECIFIED
THEN
INSERT THE COUNTER INTO THE BODY TEXT
ELSE
SET I = FOOTNOTE COUNTER
DO UNTIL I = 0
INSERT FOOTNOTE GRAPHIC
I = I - 1
ENDDO
ENDIF
ENDIF
ENDIF
END TABLE 5 (FNNUM)
```

The routine RSOLVE in Table 6 is invoked by the paginator routine (DOCPA) if the footnote placement is specified to be "bottom of page" not "bottom of document". If the footnote placement is specified to be "bottom of document", then resolution occurs in the routine EDOC. Its function is to resolve one or more footnote reference controls that the paginator encountered after adjusting the cursored body text line during document pagination. Note that the paginator (DOCPA) invokes this routine only after completing the line adjustment of the cursored line and additionally determining that the cursored line will fit on the current page. This routine:

(a) insures that the footnote format values are in a range that will enable feasible resolution. These include the maximum number of footnote text lines, and the number of blank lines between footnotes, (b) determines whether the current page is to be terminated prematurely. This occurs when the first footnote text line for the footnote reference that is being processed will not appear on the same page as its reference. This usually occurs when there is enough footnote text pending such that the maximum number of footnote text lines is surpassed, (c) resolves the footnòte references encountered on the current line via the invocation of routine GETFN to fetch and resolve each footnote reference.

TABLE 6

```
BEGIN (RSOLVE)
IF THERE ARE FOOTNOTES TO RESOLVE FOR THE
CURRENT LINE THEN
IF AT LEAST ONE MORE FOOTNOTE TEXT LINE WILL
FIT AT THE BOTTOM OF THE CURRENT PAGE BEING
PAGINATED THEN
IF THE RESOLUTION ALGORITHM TO BE USED IS THE
LIMITED TSB ALGORITHM THEN
INITIALIZE THE FORMATTED FOOTNOTE LIMITED
TSB
INVOKE GETFN - RESOLVE/FORMAT FOOTNOTES ON
THIS LINE
IF THE FORMATTED FOOTNOTE LIMITED TSB
BECAME FULL THEN
RESTORE POINT OF OPERATION TO THE FIRST
FOOTNOTE OF THIS PAGE
RE-INITIALIZE PARAMETERS FOR THE FIRST
FOOTNOTE OF THIS PAGE
INVOKE GETFN - RESOLVE/FORMAT FOOTNOTES ON
THIS LINE USING INDEFINITE LENGTH ALGORITHM
ENDIF
ELSE
INVOKE GETFN - RESOLVE/FORMAT FOOTNOTES ON
THIS LINE USING THE INDEFINITE LENGTH
ALGORITHM
ENDIF
ELSE
INDICATE PREMATURE PAGE TERMINATION DUE TO
INSUFFICIENT ROOM AT THE BOTTOM OF THE PAGE
FOR ONE MORE FOOTNOTE TEXT LINE
ENDIF
ENDIF
RETURN
END TABLE 6 (RSOLVE)
```

The routine GETFN in Table 7 is invoked by the routine RSOLVE to perform the actual resolution of footnote references. Its function is to resolve each footnote reference control that the paginator encountered after adjusting the cursored body text line. It is already assumed that there is room at the bottom of the page for at least one more footnote text line and that the footnote placement is the bottom of page, not bottom of document.

Resolution is performed one of two ways:

If all of the footnotes on a page can be copied and formatted into the formatted footnote TSB (140), then the limited footnote algorithm is used. This method does a minimal amount of diskette accessing and performs almost all processing in memory. The result is fast formatting and resolution of each footnote reference since all of the formatted footnotes will be in memory when the routine EPAG is called at the end of the page to insert the footnotes at the bottom of the page.

This method is used most of the time for footnote placement at the bottom of a page unless very large footnotes are being processed.

If not all the footnotes on a page will fit into the formatted footnote TSB 140, then the indefinite footnote algorithm is used. This involves storing the current body text page back onto the diskette unit 24 and moving the TSB point of opeṙation to the page that contains the footnote text to be formatted and resolved (even if the page is an in another document). Once the footnote is formatted it is stored back onto the diskette and the TSB point of operation is moved back to its original point in the body text page. With this approach the routine EPAG will fetch the footnote text from diskette unit 24 to the bottom of the page.

Resolution typically involves the following items:

Formatting the footnote text based on the active footnote format. This implies that the Document or Alternate Document Format (whichever is active) will be scanned in order to obtain the parameters required to format the footnote text correctly.

Inserting the appropriate footnote number bracketed within a BFT/EFT control sequence with the appropriate leading/trailing text and/or controls prior to the footnote text.

Calculating the number of footnote text lines corresponding to the footnote reference being processed.

Updating the number of pending footnotes on the current line to be inserted.

Calculating the total vertical escapement due to footnote text that is to be inserted at the bottom of the page. This value is used by the paginator in its page ending decision logic.

TABLE 7

```
BEGIN
OBTAIN ADDRESSABILITY TO THE FIRST FOOTNOTE
REFERENCE TO BE RESOLVED
UNTIL THERE ARE NO MORE FOOTNOTES TO BE
RESOLVED DO
IF PERFORMING LIMITED RESOLUTION AND BLANK
LINES MUST BE INSERTED TO DELIMIT THIS
FOOTNOTE THEN
INSERT THE BLANK LINES VIA PROGRAM SEGMENT
BLANK_LN
ENDIF
COPY THE FOOTNOTE TEXT INTO THE LIMITED TSB
AND DETERMINE THE NUMBER OF FOOTNOTE TEXT
LINES VIA THE PROGRAM SEGMENT COPY_FN
IF PERFORMING LIMITED RESOLUTION AND THE
ENTRY COULD NOT BE RESOLVED SUCCESSFULLY
THEN
INSERT INTO THE LIMITED TSB THE APPROPRIATE
ERROR MESSAGE
ENDIF
OBTAIN THE NUMBER OF LINES FOR THIS FOOTNOTE
REFERENCE
CALCULATE THE VERTICAL ESCAPEMENT THAT
WILL BE GENERATED FOR THE FOOTNOTE TEXT
LINES CORRESPONDING TO THIS FOOTNOTE
REFERENCE
UPDATE THE TOTAL VERTICAL ESCAPEMENTS
FOR ALL FOOTNOTES ON THIS PAGE
SETUP TO PROCESS THE NEXT FOOTNOTE
ENDDO
UPDATE THE ESCAPEMENT VALUES FOR THE
PAGINATOR VIA PROGRAM SEGMENT UPDATE
SET AN APPROPRIATE EXIT RETURN CODE
RETURN
BEGSEG (BLANK_LN)
DETERMINE HOW MANY BLANK LINES MUST BE
INSERTED TO PROVIDE FOOTNOTE SPACING
IF THE PREVIOUS FOOTNOTE DID NOT END WITH
A LINE ENDING CONTROL THEN
INSERT A REQUIRED CARRIER RETURN TO FORCE
THE POINT OF INSERTION FOR THE BLANK
DELIMITER LINES TO THE START OF A LINE
ENDIF
UNTIL ALL THE BLANK LINES ARE INSERTED INTO
THE LIMITED TSB BUFFER DO
INSERT A REQUIRED CARRIER RETURN PRIOR TO
THE POINT OF OPERATION
ENDDO
ENDSEG (BLANK_LN)
BEGSEG (COPY_FN)
IF PERFORMING LIMITED FOOTNOTE ALGORITHM
RESOLUTION THEN COPY THE FOOTNOTE TEXT INTO
THE FORMATTED FOOTNOTE LIMITED TSB
ELSE
GO TO THE FOOTNOTE PAGE VIA THE INDEFINITE
LENGTH DOCUMENT TSB BY MOVING THE TEXT
STORAGE BUFFER POINT OF OPERATION TO THE
```

TABLE 7-continued

```
DESIRED FOOTNOTE PAGE
ENDIF
INSERT THE FOOTNOTE NUMBER SEQUENCE PRIOR
TO THE FOOTNOTE TEXT
SETUP A COUNTER THAT WILL KEEP TRACK OF THE
NUMBER OF FOOTNOTE TEXT LINES FOR THE
FOOTNOTE REFERENCE CONTROL
UNTIL THE END OF THE FOOTNOTE TEXT IS
FOUND DO
ADJUST THE FOOTNOTE TEXT LINE BETWEEN THE
LEFT AND RIGHT MARGINS
INCREMENT THE COUNTER THAT IS KEEPING TRACK
OF THE NUMBER OF FOOTNOTE TEXT LINES
ENDDO
IF THERE ARE NO LINES IN THE FOOTNOTE TEXT
PAGE THEN
INSERT A REQUIRED CARRIER RETURN
SET THE NUMBER OF LINES FOR THIS ENTRY TO 1
ENDIF
SAVE THE NUMBER OF TEXT LINES CALCULATED IN
THE ENTRY'S LINE COUNT FIELD
IF NOT PERFORMING LIMITED TSB MODE
RESOLUTION THEN
IF THE FOOTNOTE TEXT PAGE'S PAGE ENDING
CONTROL IS NOT AT THE START OF A LINE THEN
INSERT A REQUIRED CARRIER RETURN PRIOR TO
THE PAGE END CONTROL
ENDIF
MOVE THE POINT OF OPERATION TO THE START OF
THE FOOTNOTE TEXT PAGE
DELETE THE FOOTNOTE NUMBER SEQUENCE. THE
ROUTINE EPAG WILL INSERT LATER
STORE THE FORMATTED FOOTNOTE TEXT PAGE
BACK TO THE FOOTNOTE DISKETTE
ENDIF
ENDSEG (COPY_FN)
BEGSEG (UPDATE)
DETERMINE THE MAXIMUM NUMBER OF FOOTNOTE
TEXT LINES THAT MAY BE INSERTED IN A PAGE
IF THE NUMBER OF AVAILABLE LINES TO INSERT IS
GREATER THAN THE MAXIMUM NUMBER OF
FOOTNOTE TEXT LINES THAT MAY BE INSERTED IN
A PAGE THEN
SET THE NUMBER OF AVAILABLE LINES TO INSERT
EQUAL TO THE MAXIMUM NUMBER OF FOOTNOTE
TEXT LINES THAT MAY BE INSERTED IN A PAGE
ENDIF
UPDATE THE NEW VALUE FOR NUMBER OF TEXT
LINES TO INSERT
UPDATE THE NEW VALUE FOR ESCAPEMENT DUE TO
TEXT LINES THAT ARE TO BE INSERTED
INSURE THAT THE CALCULATED ESCAPEMENT WILL
ALL FIT IN THE CURRENT PAGE. ADJUST VALUE IF
THE ESCAPEMENT IS TOO MUCH
ENDSEG (UPDATE)
END (GETFN)
```

The purpose of the routine EPAG in Table 8 is to move FORMATTED footnote text to the end of the current page. The footnote text resides either in the formatted footnote TSB 140 (if the limited algorithm is used) or on pages in the footnote library (in a separate document or on page 9000 or above if in the same document).

Upon invocation, a page end decision has been made by the paginator and the TSB point of operation is at the start of a line. This line will be forced to the next page via the insertion of a page end control, but before the page end control is inserted, this routine must insert (prior to the TSB point of operation) the appropriate number of formatted footnote text lines along with all the necessary formatting controls. All the information required for these insertions is available in the footnote control block 108 and footnote reference buffer 110.

After determining how many lines it must insert, this routine inserts the necessary formatting controls to precede the footnote text, the separator line, and the formatting controls to following the footnote text.

After the formatting controls are inserted, this routine either fetches all of the formatted footnote text from the formatted footnote TSB 140 (if the limited algorithm was able to be used) or (if the indefinite length algorithm had to be used) then it fetches in the footnote text for the first footnote. The footnote's respective entry in the footnote reference buffer 110 contains the pointers to each footnote text page. Note that the footnote reference buffer 110 causes the system to have an "internal resolution limit" of about 20 footnotes per page if each footnote is stored in a separate document and up to 142 footnotes per page if each footnote is stored on page 9000 or above of the same document that contains the body text with the corresponding footnote references.

If necessary, lines that have been inserted in the previous page will be deleted after the entire footnote text is fetched.

If the entire footnote fits and more footnote text is pending, the insertion sequence will continue with the next footnote.

If the entire footnote won't fit, then the footnote text that will not fit will be deleted. These lines will appear on the next page.

After the insertion is complete, the necessary pointers in the footnote resolution control block 108 are updated. The footnote resolution buffer will also be updated to reflect the insertions.

TABLE 8

```
BEGIN
MODIFY THE VERTICAL ESCAPEMENT DUE TO
PENDING FOOTNOTE TEXT LINES THAT ARE TO BE
INSERTED AT THE BOTTOM OF THIS CURRENT PAGE
DUE TO ANY "WIDOW" OR "ORPHAN" LINE
DECISIONS MADE BY THE PAGINATOR
IF IT HAS BEEN DETERMINED THAT THERE ARE
FORMATTED FOOTNOTE TEXT LINES TO INSERT AT
THE BOTTOM OF THIS CURRENT PAGE THEN
SAVE THE CURRENT PAGE END LOCATION
INSERT PRIOR TO THE CURRENT POINT OF
OPERATION THE FOOTNOTE TEXT FORMATTING
SEQUENCE THAT WILL ENCAPSULATE THE PENDING
FOOTNOTE TEXT
IF PERFORMING LIMITED MODE TSB
ALGORITHM THEN
INSERT THE PENDING FOOTNOTE TEXT VIA
PROGRAM SEGMENT LIMITED
ELSE
INSERT THE PENDING FOOTNOTE TEXT VIA
PROGRAM SEGMENT INDEF
ENDIF
RESTORE POINT OF OPERATION TO PAGE END
LOCATION
ENDIF
RETURN
BEGSEG (LIMITED)
OBTAIN THE VERTICAL ESCAPEMENT OF THE
FOOTNOTE TEXT LINES TO BE INSERTED
IF THE INTERNAL RESOLUTION LIMIT HAS NOT BEEN
REACHED AND ALL OF THE PENDING FOOTNOTE
TEXT WILL FIT THEN
INSERT ALL OF THE PENDING FOOTNOTE TEXT
ELSE
ADVANCE TO THE TOP OF THE LIMITED TSB BUFFER
MOVE THE POINT OF OPERATION TO THE END OF
THE LAST FOOTNOTE LINE THAT IS TO BE COPIED
INSERT INTO PAGE THE FOOTNOTE TEXT THAT IS
BOUNDED BY THE TOP OF LIMITED TSB BUFFER AND
THE POINT OF OPERATION
ENDIF
UPDATE THE FOOTNOTE CONTROL BLOCK AND
FOOTNOTE REFERENCE BUFFER TO REFLECT THE
NUMBER OF FOOTNOTE TEXT LINES INSERTED
ENDSEG (LIMITED)
```

TABLE 8-continued

```
BEGSEG
OBTAIN THE VERTICAL ESCAPEMENT DUE TO
FOOTNOTE TEXT LINES THAT ARE TO BE INSERTED
OBTAIN THE OFFSET TO THE FIRST FOOTNOTE
ENTRY IN THE FOOTNOTE RESOLUTION BUFFER
SETUP A COUNTER FOR THE NUMBER OF LINES
INSERTED UNTIL ALL THE FOOTNOTE TEXT LINES
THAT ARE TO APPEAR ON THIS PAGE ARE
INSERTED DO
IF THE FOOTNOTE REFERENCE WAS RESOLVED
SUCCESSFULLY THEN
INSERT THE FOOTNOTE TEXT
ELSE
INSERT INTO TEXT THE APPROPRIATE FOOTNOTE
RESOLUTION ERROR MESSAGE
ENDIF
ADD TO THE COUNTER KEEPING TRACK OF HOW
MANY LINES HAVE BEEN INSERTED THE NUMBER
OF INSERTED LINES FOR THIS FOOTNOTE
SUBTRACT FROM THE COUNTER KEEPING TRACK OF
HOW MUCH ESCAPEMENT REMAINS TO BE INSERTED
BY THE INSERTED ESCAPEMENT
IF THERE IS STILL MORE ROOM FOR FOOTNOTE
TEXT THEN
DETERMINE THE NUMBER OF BLANK LINES TO
INSERT FOR FOOTNOTE SPACING
DETERMINE THE ESCAPEMENT DUE TO THESE
BLANK LINES
IF THERE IS ROOM FOR THESE BLANK LINES THEN
ADJUST THE INSERTION ESCAPEMENT COUNTER
ACCORDINGLY
ADJUST THE INSERTION LINE COUNTER
ACCORDINGLY INSERT THE BLANK LINES INTO TEXT
SETUP TO PROCESS THE NEXT FOOTNOTE
ELSE
INDICATE THAT NO MORE FOOTNOTE TEXT CAN BE
INSERTED
ENDIF
ENDIF
ENDDO
UPDATE THE FOOTNOTE CONTROL BLOCK AND
FOOTNOTE REFERENCE BUFFER TO REFLECT THE
NUMBER OF FOOTNOTE TEXT LINES INSERTED
IF THERE WILL BE NO FOOTNOTE TEXT LINES
FLOWING TO THE NEXT PAGE AND SYSTEM IS
PERFORMING REGULAR RESOLUTION THEN
STOP USING THE INDEFINITE ALGORITHM SO THAT
THE LIMITED ALGORITHM WILL BE USED ON THE
NEXT PAGE ENDIF
ENDSET (INDEF)
END (EPAG)
```

TABLE 9

```
BEGIN (EDOC)
IF FOOTNOTES ARE BEING PLACED AT THE END OF
THE DOCUMENT AND THE END OF THE DOCUMENT
HAS BEEN REACHED AND NO FOOTNOTE TEXT HAS BEEN
RESOLVED THEN
OBTAIN POINTER TO THE FOOTNOTE REFERENCE
BUFFER CONTAINING POINTERS TO EVERY
FOOTNOTE FOUND IN THE DOCUMENT
UNTIL THE LAST REFERENCE HAS BEEN
RESOLVED DO
FETCH FOOTNOTE TEXT
INSERT THE NUMBER OF BLANK LINES AS
SPECIFIED BY THE "NUMBER OF BLANK LINES
BETWEEN FOOTNOTES" PARAMETER
ENDDO
ENDIF
END TABLE 9 (EDOC)
```

In summary, a unique method of, and system for, managing the assembly of body and footnote text is provided in order that an operator may format and assemble footnote text in a document. Format and assembly of the footnote text can be either at the bottom of pages of the document or at the end of the document. In addition, according to the method and system of this invention, the operator can hyphenate the document, adjust line endings, cause page ending decisions and associated widow/orphan line decisions to be made, and cause printing of the document in a single pass operation. Following input keying of the body and footnote text, operator procedure calls for causing the system to assemble the body and footnote text. The assembly operation involves combined merge and pagination operations to which either one of two separate algorithms are acceptable. A fast algorithm or the "limited footnote algorithm" is used when processing footnotes of limited size. A slower algorithm or the "indefinite footnote algorithm" is used when processing lengthy footnotes. The system automatically determines which algorithm is to be in effect. This determination is on a per page basis. Whenever possible, the "limited footnote algorithm" will be the algorithm in effect. Following assembly, the document can be display recalled on a page basis for review and editing. Thereafter, the document is ready to be printed.

While the invention has been particularly shown and described with reference to a preferred embodiment, it will be understood by those skilled in the art that various changes in form and detail may be made without departing from the spirit and scope of the invention.

We claim:

1. A method of managing assembly of separately stored document body and footnote text for display review, with a keyboard/display system, of an assembled footnoted document, said method comprising:

(a) loading footnote text lines for a corresponding footnote into a footnote buffer following a counting by a counting means of
  (1) body text lines up to a footnote reference point, and
  (2) footnote text lines for said corresponding footnote, if said counted footnote text lines will fit within said footnote buffer; and (b) loading said footnote text lines from said footnote buffer and counted body text lines, into a page buffer as long as all of said footnote lines will fit within said page buffer.

2. A method according to claim 1 including specifying a number of lines to be displayed.

3. A method according to claim 2 including displaying a number of lines from said page buffer equal to said specified number of lines.

4. A method according to claim 3 including loading said body text lines into the top of said page buffer.

5. A method according to claim 4 including loading said footnote lines into said page buffer following said text lines.

6. A method according to claim 5 including formatting a footnote which will not fit within said footnote buffer and storing said formatted footnote in a bulk store.

7. A method according to claim 6 including formatting said body text stored in said page buffer.

8. A method according to claim 7 including displaying said body text and as many lines from said formatted footnote as can be displayed within said specified number of lines.

9. A method according to claim 8 including marking lines from said footnote text which will not be displayed for inclusion with a following page to be displayed.

10. A system for managing assembly of separately stored document and footnote text for display review, said system comprising:

(a) means for sequentially counting body text lines up to a footnote reference point and footnote text lines for a corresponding footnote until a count is obtained equal to or less than a count for a line capacity of a page buffer;

(b) means for loading said footnote text lines and said body text lines into said page buffer; and (c) means for causing a display of a specified number of lines of said page buffer.

* * * * *